United States Patent [19]

Bauer

[11] Patent Number: 5,615,867

[45] Date of Patent: Apr. 1, 1997

[54] FLUID-FILLED UNIT OF A CYLINDER AND A PISTON ROD, IN PARTICULAR GAS SPRING

[75] Inventor: Hans-Peter Bauer, Altdorf, Germany

[73] Assignee: Suspa Compart Aktiengesellschaft, Altdorf, Germany

[21] Appl. No.: 605,781

[22] Filed: Feb. 22, 1996

[30] Foreign Application Priority Data

Feb. 24, 1995 [DE] Germany .................... 195 06 479.8

[51] Int. Cl.$^6$ ................. F16F 9/36; F16F 9/54; F16J 15/02; F16J 10/02

[52] U.S. Cl. .................. 267/64.11; 188/321.11; 267/120; 267/64.28

[58] Field of Search .............. 267/64.11, 64.28, 267/120, 129, 64.12, 64.13, 113, 124; 188/322.19, 321.11, 322.21, 269, 300, 322.16

[56] References Cited

U.S. PATENT DOCUMENTS

| | | | |
|---|---|---|---|
| 1,567,515 | 12/1925 | Kijima et al. | 188/322.19 |
| 2,957,734 | 10/1960 | McLeod . | |
| 3,190,635 | 6/1965 | Wustenhagen et al. | 267/64.28 |
| 3,744,844 | 7/1973 | Nomaki et al. | 188/300 |
| 4,079,925 | 3/1978 | Salin | 267/129 |
| 4,257,580 | 3/1981 | Schnitziw | 267/64.28 |
| 4,298,194 | 11/1981 | Marx | 267/64.11 |
| 4,728,084 | 3/1988 | Bauer et al. | 267/64.11 |
| 4,792,128 | 12/1988 | Holley | 267/64.28 |
| 4,949,941 | 8/1990 | Bauer et al. | 267/124 |
| 5,126,925 | 6/1992 | Mintgen et al. | 267/120 |
| 5,141,210 | 8/1992 | Bauer et al. | 188/322.21 |
| 5,215,291 | 6/1993 | Bauer et al. | 188/322.19 |

FOREIGN PATENT DOCUMENTS

| | | | |
|---|---|---|---|
| 0565015 | 10/1993 | European Pat. Off. . | |
| 0621349 | 5/1927 | France | 267/64.11 |
| 2596481 | 10/1987 | France . | |
| 939784 | 8/1955 | Germany . | |
| 1712691 | 12/1955 | Germany . | |
| 976161 | 3/1956 | Germany . | |
| 1748843 | 7/1957 | Germany . | |
| 1932939 | 2/1966 | Germany . | |
| 1934249 | 1/1971 | Germany | 188/321.11 |
| 2757232 | 7/1978 | Germany | 267/64.11 |
| 3301412C1 | 1/1983 | Germany . | |
| 3700934A1 | 1/1987 | Germany . | |
| 3900690A1 | 1/1989 | Germany . | |
| 8612612U1 | 12/1989 | Germany . | |
| 4308006A1 | 3/1993 | Germany . | |
| 4139940 | 6/1993 | Germany | 188/321.11 |
| 61-241542 | 10/1986 | Japan | 188/322.21 |
| 4249633 | 9/1992 | Japan | 188/321.11 |
| 405202975 | 8/1993 | Japan | 267/64.11 |
| 2015121 | 9/1979 | United Kingdom | 267/64.28 |

OTHER PUBLICATIONS

Hisashi Hanawa, Patents Abstracts of Japan, vol. 17 No. 26, M–1354 Jan. 19, 1993.

Primary Examiner—Douglas C. Butler
Attorney, Agent, or Firm—Browdy and Neimark

[57] ABSTRACT

A fluid-filled unit of a cylinder and a piston rod, in particular a gas spring, has a housing, which has an end closed by a plug. A ball socket of a ball-and-socket joint is formed in this plug. The design may additionally be such that the filling with compressed gas of the housing takes place in the vicinity of the plug.

3 Claims, 3 Drawing Sheets

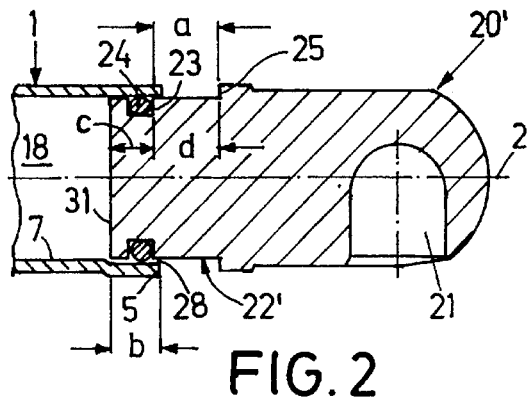
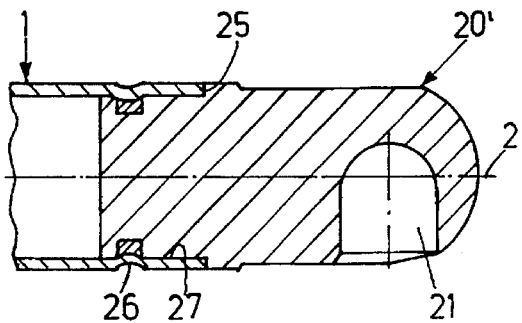
FIG.2  FIG.3
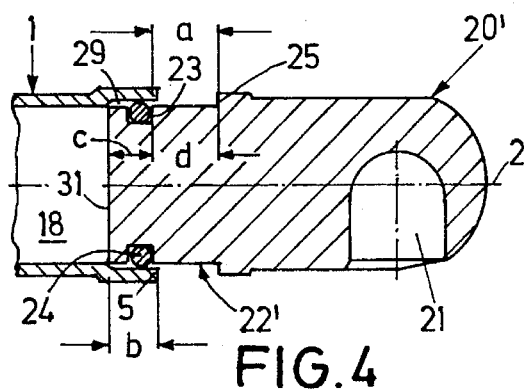
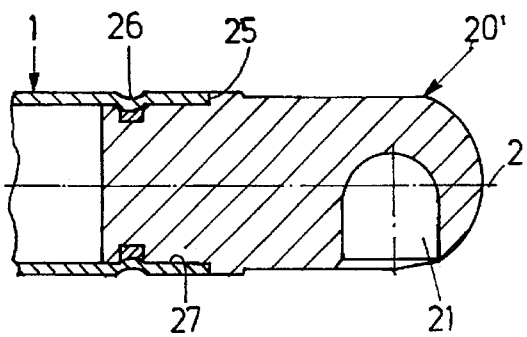
FIG.4  FIG.5
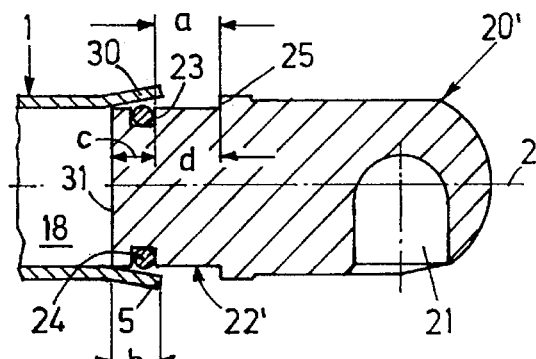
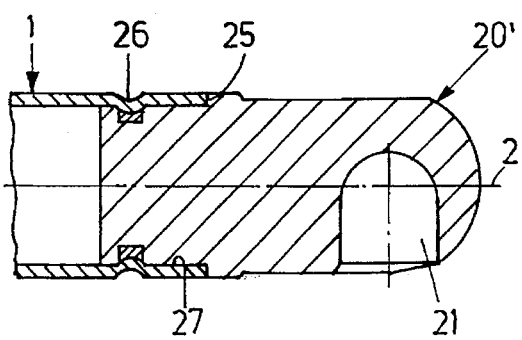
FIG.6  FIG.7

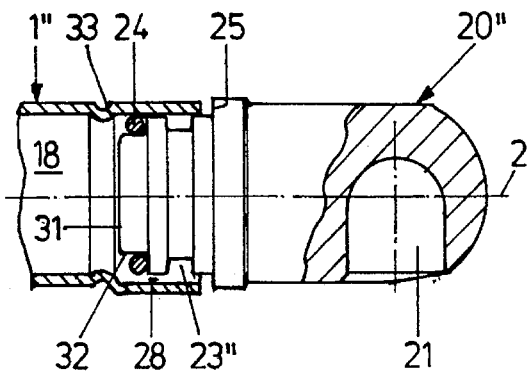
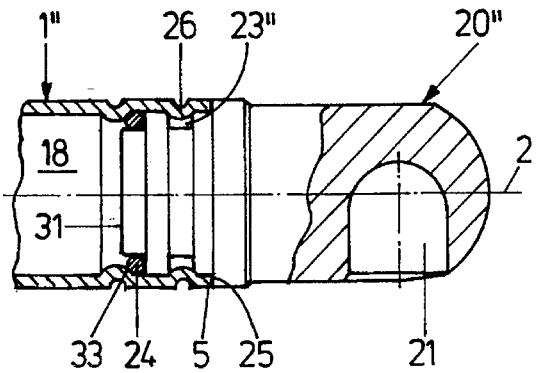
FIG. 8   FIG. 9
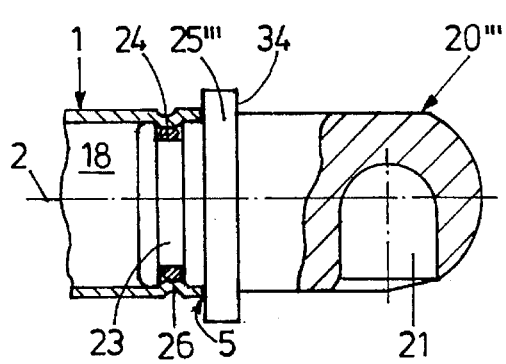
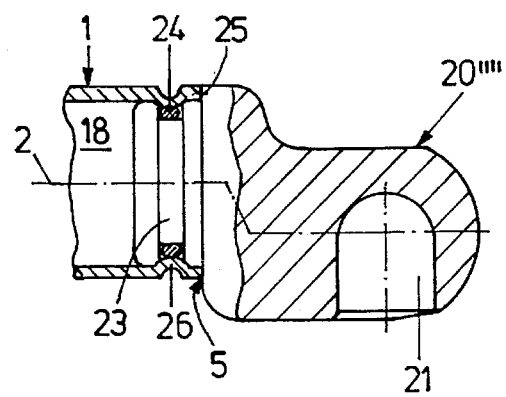
FIG. 10   FIG. 11
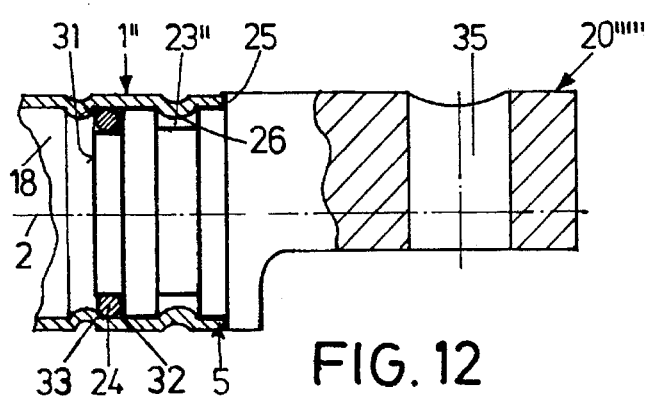
FIG. 12

FLUID-FILLED UNIT OF A CYLINDER AND A PISTON ROD, IN PARTICULAR GAS SPRING

BACKGROUND OF THE INVENTION

FIELD OF THE INVENTION

The invention relates to a fluid-filled unit of a cylinder and a piston rod, in particular a gas spring.

BACKGROUND ART

As a rule, units of the generic type are gas springs filled at least partially with compressed gas and, if required, partially with oil. Very often they are shock absorbers that are substantially filled with oil, having a gas-filled compensation chamber. Whenever gas springs are mentioned in the following, this will regularly mean the units covered by the general definition, i.e. in particular gas springs that are substantially filled with compressed gas, gas springs that are, to some extent, filled with oil in addition to the compressed gas, and shock absorbers that are substantially filled with oil and, only to some minor degree, with gas. As a rule, these units have a cylindrical housing, in which a piston rod is coaxially disposed for displacement. Its end located inside the housing has a piston, which may be a damping piston. The end of the housing on the piston-rod exit side is provided with a guide which also accommodates a sealing unit. The latter comprises an exterior seal resting sealingly on the inside wall of the housing and an interior seal resting on the piston rod. The exterior seal and the interior seal may form a single piece. Since the piston rod is moved in relation to the interior seal, the interior seal is a so-called lip seal as a rule, i.e. the lips rest sealingly on the piston rod. Filling these gas springs with compressed gas usually takes place in such a way that the compressed gas is forced into the interior of the housing through the very narrow annular gap between the guide and the piston rod and between the lips of the interior seal and the piston rod. This is possible because the lips exhibit sealing characteristics according to which they are primarily pressed against the piston rod under the gas pressure prevailing in the housing. Practice has shown that observing an exacting tolerance for the extraction force is problematic because of the overpressure needed for opening the seal when the gas spring is filled.

At the end of the piston rod that is outside the housing on the one hand and at the the closed end of the housing on the other, units of the generic type have fastening elements which may be the corresponding connecting pieces of ball-and-socket joints. In this case, the housing is beaded inwards at its closed end and provided with a threaded neck that is welded on and on which to screw the socket of a ball joint as a fastening element. This is extraordinarily complicated. Also a so-called eye may be provided.

SUMMARY OF THE INVENTION

It is the object of the invention to embody a unit of a cylinder and a piston rod in such a way that the attachment to its housing of a fastening element is simplified.

According to the invention, this object is attained by a fluid-filled unit of a cylinder and a piston rod, in particular a gas spring, comprising a substantially cylindrical housing, which has a central longitudinal axis and a closed first end and a second end and an inside wall; a piston rod disposed coaxially of the central longitudinal axis partially within the housing and partially outside the housing; a piston attached to the piston rod and associated with the inside wall; a guide disposed at the second end of the housing for the guidance of the piston rod in the direction of the central longitudinal axis; an exterior seal disposed in the vicinity of the guide and bearing sealingly against the inside wall; an interior seal disposed in the vicinity of the guide and bearing sealingly against the piston rod; and a plug, which is disposed in the vicinity of the first end, which is joined to the housing by positive fit, which is provided with an annular seal bearing against the inside wall, and which is provided with a fastening element. The fastening element, for instance a ball socket, simultaneously constitutes a plug for the housing formed by a cylindrical pipe. All the additional operations otherwise necessary to close the housing can be omitted. The plug—as a rule of plastic material—only has to be inserted into the end of the housing, where it must be arrested. In addition, this design ensures that the filling of the housing with compressed gas can take place from the end associated with the plug, which helps avoid the problems incurred when filling takes place via the seal at the end of the piston rod exit. The bridging way to be formed for filling purposes on the end to be closed of the housing can be removed during the closing operation.

When the plug is provided with a stop to bear against the first end of the housing, and when the distance between the annular groove and the stop exceeds the distance between the annular groove and the end, located in the housing, of the plug, this will ensure the filling of the housing with compressed gas to take place while the plug is partially inserted in the associated end. Of course, this way of filling the housing from this end and closing it by means of a plug is also possible and can be used to advantage when the plug itself is not provided with a ball socket and does not otherwise form a fastening element.

Further features, advantages and details of the invention will become apparent from the description of exemplary embodiments, taken in conjunction with the drawing.

BRIEF DESCRIPTION OF THE DRAWING

FIG. 2 is an illustration of a second embodiment of the plug in a position for filling the housing of the gas spring with compressed gas, FIG. 3 is an illustration of the embodiment of FIG. 2 with the plug joined to the housing, FIG. 4 is an illustration of another embodiment of a plug in a position for filling the housing of the gas spring with compressed gas, FIG. 5 is an illustration of the embodiment of FIG. 4 with the plug ioined to the housing, FIG. 6 is an illustration of a further embodiment of a plug in a position for filling the housing of the gas spring with compressed gas, FIG. 7 is an illustration of the embodiment of FIG. 6 with the plug joined to the housing, FIG. 8 is an illustration of another embodiment of a plug in a position for filling the housing of the gas spring with compressed gas, FIG. 9 is an illustration according to FIG. 8 with the plug joined to the housing, FIG. 10 is an illustration of another embodiment of a plug with a collar, FIG. 11 is an illustration of another embodiment of a plug with ball socket bent at right angles, and FIG. 12 is an illustration of an embodiment of a plug with a fastening eye.

DESCRIPTION OF THE PREFERRED EMBODIMENTS

Figure 1:
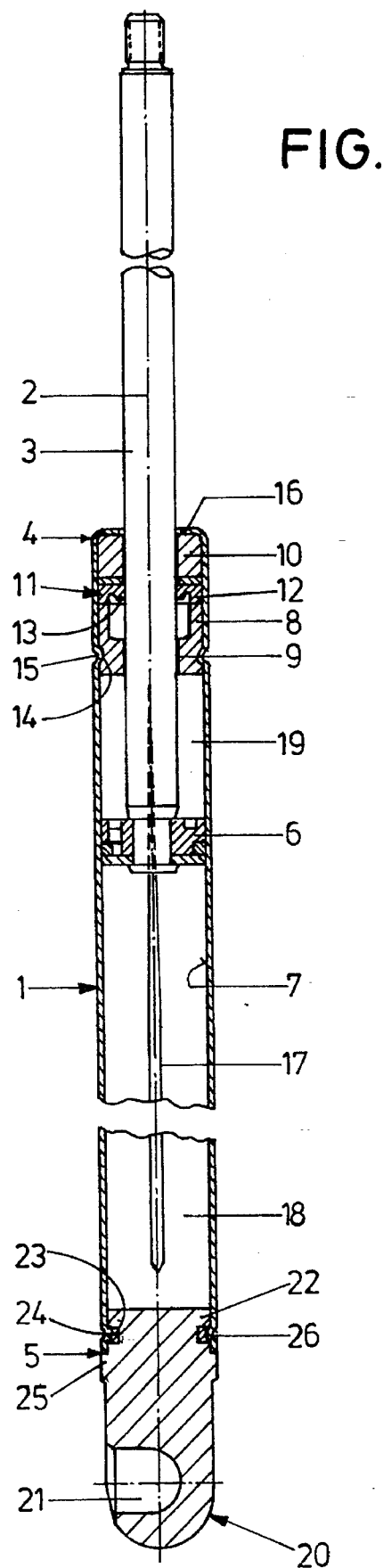
FIG. 1 is a longitudinal section of a gas spring.

The gas spring of the drawing comprises a housing 1 substantially consisting of a cylindrical tube with a central longitudinal axis 2 and a piston rod 3 coaxial with the axis 1 and displaceable in the housing 1. The piston rod 3 is extended out of the end 4 the housing 1. The other end 5 of the housing 1 is closed gas-tight.

The end of the piston rod 3 located in the housing 1 is provided with a piston 6 which is guided on the inside wall 7 of the housing 1. The piston 6 is a so-called damping piston exhibiting different damping characteristics for the insertion of the piston rod 3 into the housing 1 and for the extraction of the piston rod 3 out of the housing 1.

At the end 4 of the housing 1, the piston rod 3 is sealingly guided in a guide. The guide itself consists of two components, namely of a stop and spacing sleeve 8 with a guide section 9 for the piston 3 and of a guide ring 10. The sleeve 8 faces the piston 6, the guide section 9 being turned towards the piston 6, too. The guide ring 10 faces the end 4 of the housing 1. A seal 11 is disposed between the sleeve 8 and the ring 10, an exterior sealing ring 12 of the seal 11 bearing sealingly against the inside wall 7 of the housing 1. It further comprises an interior sealing ring 13, which is formed in one piece with the exterior sealing ring 12, and which bears sealingly against the piston rod 3. This interior sealing ring 13 can be provided with comparatively sensitive sealing lips, which rest on the piston rod 3.

The sleeve 8 has an exterior circumferential groove 14, with which engages a crimp 15 formed in the housing 1 and projecting towards the axis 2, the stop and spacing sleeve 8 thus being tightly joined to the housing 1 and defined in its position relative to the housing 1 in the direction of the axis 2. One end 4 of the housing is provided with a bead 16 enclosing the guide ring 10, the latter thus being arrested in the housing 1. Providing a crimp 15 on the one hand and a bead 16 on the other, will predetermine the distance of the guide ring 10 from the sleeve 8 and thus the bias of the seal 11 in the direction of the axis 2 between the ring 10 and the sleeve 8. As a result of this bias in the direction of the axis 2, there is some bracing in the radial direction, i.e. this bias in the direction of the axis 2 will also predetermine the pressure by which the exterior sealing ring 11 applies on the inside wall 7 and the interior sealing ring 13 on the piston rod 3.

The inside wall 7 of the housing 1 is provided with a passage way 17 formed by a longitudinal crimp, through which compressed gas can flow past the piston 6, out of the housing chamber 18 defined by the piston 6 and the closed end 5, into the housing chamber 19 defined by the piston 6 and the guide, and vice versa. The housing 1 is partially or completely filled with compressed gas.

At the end 5, the housing 1 is closed by a plug 20 which, as a fastening element, exhibits the socket 21 of a ball-and-socket joint. The features serving to retain a ball in the socket 21 are not shown; they can be of any prior art design. The plug 20 has a cylindrical section 22 which bears against the inside wall 7. This cylindrical section is provided with an annular groove 23 in which is disposed an annular seal 24 bearing against the inside wall 7. The end 5 of the housing 1 bears against an annular collar 25 of the plug 20, thereby axially defining and arresting the position of the plug 20 relative to the housing 1. The fastening of the plug 20 to the housing 1 is effected by a crimp 26 provided on the housing 1 by rolling in the vicinity of the annular groove 23 or the annular seal 24. This crimp 26 is forced into the annular groove 23, the plug 20 being simultaneously arrested axially on the housing 1. Simultaneously, this serves to bias the annular seal 24 so that it rests sealingly all around within the annular groove 23 and on the inside wall 7 in the vicinity of the crimp 26. In this embodiment, the filling of the housing with compressed gas can take place in known fashion in the vicinity of the end 4 of the housing 1. In the embodiments according to FIGS. 2 to 9, the filling of the housing 1 takes place in the vicinity of the plug 20'. In all the three embodiments according to FIGS. 2, 3 and 4, 5 and 6, 7, respectively, the cylindrical section 22' of the plug 20' is longer than in the embodiment of FIG. 1, the difference residing in that the portion 27 between the annular groove 23 and the annular collar 25 has a length a that exceeds that of the embodiment of FIG. 1. In the embodiment according to FIGS. 2 and 3, the tube forming the housing 1 of the gas spring has a bridging way 28 in the vicinity of the end 5, the bridging way 28 being formed by groove or lengthwise crimp extending parallel to the axis 2 and formed on the inside wall 7 of the housing 1. The length b of the groove of crimp from the end 5 on is smaller than the length a of the portion 27.

To fill the housing 1 with compressed gas, the plug 20' is pushed into the housing 1 as far as shown in FIG. 2, the annular seal 24 and the bridging way 28 overlapping, i.e the latter bridges the annular seal 24. The compressed gas can enter the housing chambers 18, 19 via this bridging way 28. When the given filling pressure is reached in the housing 1, the plug 20' is pushed into the housing 1 until the end 5 of the housing 1 bears against the annular collar 25. The annular seal 24 rests all around on the inside wall 7 of the housing 1, the bridging way 28 now overlapping the portion 27. This is when the crimp 26 is provided by rolling, the plug 20' thus being arrested in the described manner. On this occasion, also the bridging way 28 is removed by corresponding deformation of the housing 1, as seen in FIG. 3.

The embodiment according to FIGS. 4 and 5 differs from that according to FIGS. 2 and 3 only in that the end 5 of the housing 1 is provided with a bridging way 29 that is realized by a cylindrical all-round expansion, a so-called drifting of the tube constituting the housing 1.

The embodiment according to FIGS. 6 and 7 differs from that of FIGS. 4 and 5 only in that the bridging way 30 is produced by a conical all-round expansion, i.e. a conical drifting of the tube constituting the housing 1 in the vicinity of the latter's end 5.

In all the embodiments according to FIGS. 2 to 7, the length a exceeds the distance c of the annular groove 23, and thus of the annular seal 24, from the end 31, to be disposed in the housing 1, on the face of the plug 20'. In particular, the distance d of the annular groove 23, and thus of the annular seal 24, from the annular collar 25 exceeds the distance c. This ensures that, during the filling with compressed gas, the housing 1 may already overlap the annular seal 24 and that a gas passage is simultaneously left open at the end 31 of the plug 20'. On the other hand it is ensured that, after the insertion of the plug 20' into the housing 1 to such an extent that the annular collar 25 bears against the end 5, the seal is no longer bridged by the bridging way 28 or 29 or 30, respectively.

The embodiment according to FIGS. 8 and 9 has a plug 20" with a ball socket 21, the cylindrical section 22" of which has an annular groove. 23" disposed in vicinity to the annular collar 25. At the end 31 on the face of the plug 20", provision is made for an annular recess 32 open towards the housing chamber 18 and receiving an annular seal 24 which can be placed into this recess 32 from the end 31 on the face. This embodiment has the advantage that the annular recess 32 can be produced reliably without any bur during the injection-molding of the plug 20", the risk of damages to the annular seal 24 being precluded reliably. As a bearing surface 33 for the annular seal, a crimp is provided in the housing 1", extending all around and projecting inwards towards the axis 2, the annular seal 24 being pressed against the crimp when the end 5 of the housing 1" is pressed against the annular collar 25. For filling the housing 1" with compressed gas, a bridging way 28 in the form of a lengthwise crimp is provided in the same way as with the embodiment of FIGS. 2 and 3. The filling of the housing 1" takes place in the position shown in FIG. 8, in which the annular seal 24 does not rest on the bearing surface 33 and is bridged by the bridging way 28. After the filling of the housing 1", the latter's end 5 is forced against the annular collar 25, as a result of which the annular seal 24 rests sealingly on the bearing surface 33. Then a crimp 26 is provided by rolling on the housing 1" at a place where the latter will lap the annular groove 23". Simultaneously, the bridging way 28 is removed by corresponding deformation of the housing 1", as seen in FIG. 9.

The embodiment of FIG. 10 differs from that of FIG. 1 only in that the plug 20'" has an annular collar 25'" which extends radially to the axis 2 to project over the actual plug 20'" to such an extent that is forms an annular positioning surface 34 on the side turned towards the ball socket 21. The gas spring can be placed on this annular positioning surface 34 for instance when varnish-coated on a coating equipment, the portion of the ball socket 21 then projecting into a depression of the supporting surface and thus being protected.

The embodiment according to FIG. 11 differs from that according to FIG. 1 only in that the portion of the plug 20"" comprising the ball socket 21 is clearly bent at right angles referred to the central longitudinal axis 2. This offers a great variety of mounting possibilities. Here, too, the possibilities of design are given by the fact that the plug 20"" is produced by injection-molding from plastic material—same as the plug of the other embodiments.

The embodiment according to FIG. 12 differs from the afore-mentioned embodiments primarily in that the plug 20"" is not provided with a ball socket, but that the fastening element is formed by an eye 35. Fastening bolts or pins can be pushed through this eye for articulation, which is general practice and known. The portion of the plug 20"" containing the eye 35 is clearly bent at right angles in relation to the central longitudinal axis 2—in a way similar to the embodiment according to FIG. 11. The portion of the plug 20"" that is to be accommodated in the housing 1" of the gas spring corresponds to the embodiment according to FIGS. 8 and 9.

What is claimed is:

1. A fluid-filled unit of a cylinder and a piston rod, comprising:

a substantially cylindrical housing (1, 1"), which has a central longitudinal axis (2) and a closed first end (5) and a second end (4) and a inside wall (7);

a piston rod (3) disposed coaxially of the central longitudinal axis (2) partially within the housing (1, 1") and partially outside the housing (1, 1");

a piston (6) attached to the piston rod (3) and associated with the inside wall (7);

a guide disposed at the second end (4) of the housing (1, 1") for the guidance of the piston rod (3) in the direction of the central longitudinal axis (2);

a exterior seal (12) disposed in the vicinity of the guide and bearing sealingly against the piston rod (3);

a plug (20, 20", 20""), which is disposed in the vicinity of the first end (5), which is joined to the housing (1, 1") by positive fit, which is provided with an annular seal (24) bearing against the inside wall (7), which has an end (31) located in the housing (1, 1"), and which is provided with a fastening element (21, 35);

wherein the plug (20, 20", 20"") is provided with a stop (25) to bear against the first end (5) of the housing;

wherein the end of the plug (31), located in the housing (1"), has an annular recess (32) open to said end of the plug (31) and accommodating the annular seal (24), and wherein the annular seal (24) bears against a bearing surface (33) projecting from the inside wall (7) of the housing (1") radially the central longitudinal axis (2);

said bearing surface (33) formed by a crimp, whereby the annular seal (21) is pressed against the crimp when the first end (5) of the housing (14) is pressed against annular collar (25);

wherein the plug (20") is arrested in relation to the housing (1") by a crimp (26) which engages with an annular groove (23");

wherein the annular groove (23") is positioned between the annular recess (32) and the stop (25) of the plug (20").

2. A unit of a cylinder and a piston rod according to claim 1, wherein a portion of the plug (20"", 20""') that comprises the fastening element (21, 35) is bent at right angles in relation to the central longitudinal axis (2).

3. A unit of a cylinder and a piston rod according to claim 1, wherein the plug (20") is provided with a positioning surface (34) turned towards the fastening element (21).

* * * * *